(12) United States Patent
Wasserman et al.

(10) Patent No.: US 10,595,555 B2
(45) Date of Patent: Mar. 24, 2020

(54) METHODS FOR CREATING CONCENTRATED PLANT MATERIAL SOLUTIONS

(71) Applicants: Jason Wasserman, Portland, OR (US); Jess Ordower, Portland, OR (US); Samuel Decker, Portland, OR (US)

(72) Inventors: Jason Wasserman, Portland, OR (US); Jess Ordower, Portland, OR (US); Samuel Decker, Portland, OR (US)

( * ) Notice: Subject to any disclaimer, the term of this patent is extended or adjusted under 35 U.S.C. 154(b) by 0 days.

(21) Appl. No.: 15/910,536

(22) Filed: Mar. 2, 2018

(65) Prior Publication Data
US 2018/0184705 A1 Jul. 5, 2018

Related U.S. Application Data

(63) Continuation-in-part of application No. 14/157,418, filed on Jan. 16, 2014, now Pat. No. 9,926,513, which
(Continued)

(51) Int. Cl.
| | |
|---|---|
| *A24B 15/26* | (2006.01) |
| *B01D 11/02* | (2006.01) |
| *A24B 15/167* | (2020.01) |
| *A24B 15/32* | (2006.01) |

(52) U.S. Cl.
CPC ............ *A24B 15/26* (2013.01); *A24B 15/167* (2016.11); *A24B 15/32* (2013.01);
(Continued)

(58) Field of Classification Search
CPC ....... C11B 9/02; C11B 9/025; B01D 11/0288; B01D 11/0292; A24B 15/26; A24B 15/167
See application file for complete search history.

(56) References Cited

U.S. PATENT DOCUMENTS

| | | | | |
|---|---|---|---|---|
| 5,005,593 A | * | 4/1991 | Fagg | ..................... A24B 15/24 131/297 |
| 5,281,732 A | | 1/1994 | Franke | |
| | | (Continued) | | |

FOREIGN PATENT DOCUMENTS

CN          103409230          11/2013

OTHER PUBLICATIONS

Melton, H., Vape Liquid Viscosity, 2013, KV5R.com, 7 pages.

*Primary Examiner* — Yate' K Cutliff
(74) *Attorney, Agent, or Firm* — Mohr Intellectual Property Law Solutions, PC

(57) ABSTRACT

Methods for creating concentrated plant material solution, including combining ethanol-soluble, water-insoluble concentrated plant material with ethanol to define mixtures and reducing the amount of ethanol in the mixtures until the mixtures have viscosities compatible for use with electronic cigarettes. Some examples include combining ethanol-soluble, water-insoluble concentrated plant material, hydrocarbon bases, and liquid solutions containing ethanol to define mixtures, removing the hydrocarbon bases from the mixtures, and reducing the ethanol content of the mixtures until the mixtures define viscosities compatible for use with electronic cigarettes. Some examples include extracting solute from source materials and including the extracted solute in the ethanol-soluble, water-insoluble concentrated plant material.

8 Claims, 11 Drawing Sheets

Related U.S. Application Data is a continuation-in-part of application No. 14/070,972, filed on Nov. 4, 2013, now Pat. No. 9,145,532, and a continuation-in-part of application No. 14/070,942, filed on Nov. 4, 2013, now Pat. No. 9,144,751.

(52) U.S. Cl.
CPC ...... *B01D 11/0219* (2013.01); *B01D 11/0288* (2013.01); *B01D 11/0292* (2013.01); *B01D 11/0296* (2013.01)

(56) References Cited

U.S. PATENT DOCUMENTS

| | | |
|---|---|---|
| 5,301,694 A | 4/1994 | Raymond et al. |
| 5,397,571 A | 3/1995 | Roland et al. |
| 5,516,923 A | 5/1996 | Herbert et al. |
| 6,551,642 B2 | 4/2003 | Trout |
| 6,821,413 B1 | 11/2004 | Alkhalidl |
| 9,144,751 B2 | 9/2015 | Wasserman et al. |
| 9,145,532 B2 | 9/2015 | Wasserman et al. |
| 9,757,664 B2 | 9/2017 | Mcghee |
| 2003/0017216 A1* | 1/2003 | Schmidt ............... A61K 36/185 424/725 |
| 2003/0196282 A1 | 10/2003 | Fyvie et al. |
| 2011/0036365 A1 | 2/2011 | Chong et al. |
| 2012/0145170 A1 | 6/2012 | O'Connell |
| 2013/0008457 A1 | 1/2013 | Zheng et al. |
| 2013/0079531 A1* | 3/2013 | Barringer ............. C07D 311/78 549/390 |
| 2015/0122272 A1 | 5/2015 | Wasserman et al. |
| 2015/0136158 A1 | 5/2015 | Stevens et al. |
| 2016/0279073 A1* | 9/2016 | Donsky ................ A61K 36/185 |

\* cited by examiner

METHODS FOR CREATING CONCENTRATED PLANT MATERIAL SOLUTIONS

CROSS REFERENCE TO RELATED APPLICATIONS

This application is a continuation-in-part of U.S. application Ser. No. 14/157,418, filed on Jan. 16, 2014, which is a continuation-in-part of U.S. application Ser. No. 14/070,972 filed on Nov. 4, 2013, and a continuation-in-part of U.S. application Ser. No. 14/070,942 filed on Nov. 4, 2013, which are hereby incorporated by reference for all purposes.

BACKGROUND

The present disclosure relates generally to methods for creating a concentrated plant material solution. In particular, methods for creating water-based, ethanol-soluble, water-insoluble concentrated plant material solutions designed for use with electronic cigarettes are described.

Known methods for creating concentrated ethanol-soluble, water-insoluble plant material solutions are not entirely satisfactory for the range of applications in which they are employed. For example, some methods for creating concentrated plant material solutions do not produce an end-product that is compatible with electronic cigarettes. First, many plant material solution end-products include substances that are unhealthy to inhale. For example, ethanol-soluble, water-insoluble plant concentrates that are in a base with a high concentration of ethanol may unintentionally inebriate a user. Some example plant material solutions may additionally or alternatively include non-food grade hydrocarbons or other chemicals that are not suitable for human ingestion.

Second, the presence of a lot of non-water substances in a plant material solution end-product may cause the end-product to work improperly with electronic cigarettes. Such non-water substances in end-products may adversely affect the vaporization rate, producing an improper amount of vapor per inhalation. Accordingly, users may not get the end-product at the desired dosage unless a substantially water-based end-product is used. Further, non-water bases may damage electronic cigarettes when used.

Thus, methods for creating water-based ethanol-soluble, water-insoluble concentrated plant material solutions to use with electronic cigarettes are needed. Examples of new and useful methods relevant to the needs existing in the field are discussed below.

SUMMARY

The present disclosure is directed to methods for creating concentrated plant material solution, including combining ethanol-soluble, water-insoluble concentrated plant material with ethanol to define mixtures and reducing the amount of ethanol in the mixtures until the mixtures have viscosities compatible for use with electronic cigarettes. Some examples include combining ethanol-soluble, water-insoluble concentrated plant material, hydrocarbon bases, and liquid solutions containing ethanol to define mixtures, removing the hydrocarbon bases from the mixtures, and reducing the ethanol content of the mixtures until the mixtures define viscosities compatible for use with electronic cigarettes. Some examples include extracting the solute from source materials and including the extracted solute in the ethanol-soluble, water-insoluble concentrated plant material.

DETAILED DESCRIPTION

The disclosed methods will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various methods are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
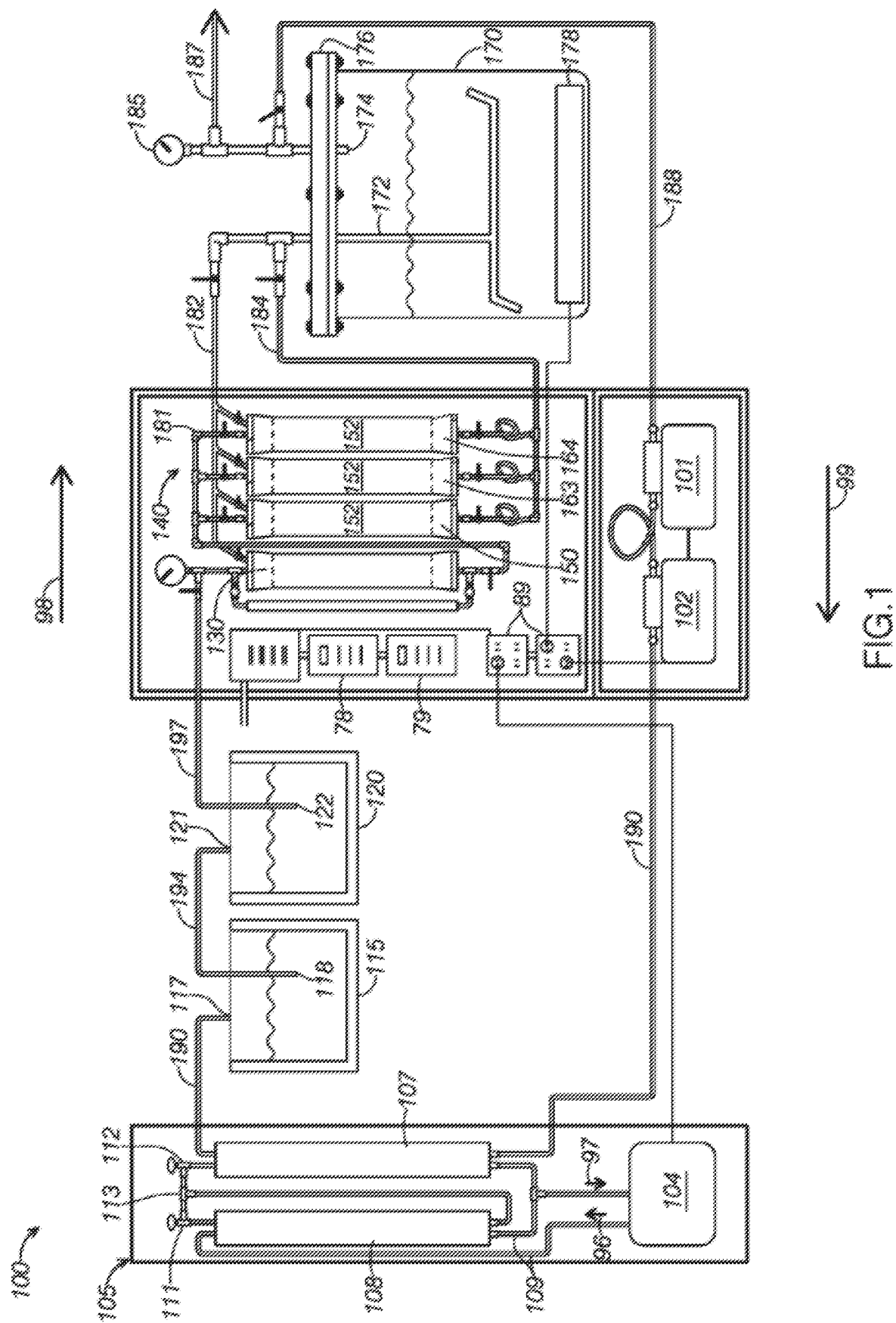
FIG. 1 is a diagrammatic view of a first example of a system for extracting solute from a source material.

With reference to FIGS. 1-5, a first example of a system for extracting solute from a source material, system 100, will now be described. As FIG. 1 shows, system 100 includes a solvent source container 120, a solvent compressor 130, a detachable canister system 140, an extract container 170, a first pump 101, a second pump 102, a condensing system 105, a solvent collection container 115. System 100 additionally includes various valves and fluid lines (defining pipes) that control the flow of fluids through system 100 during operation.

Figure 2:
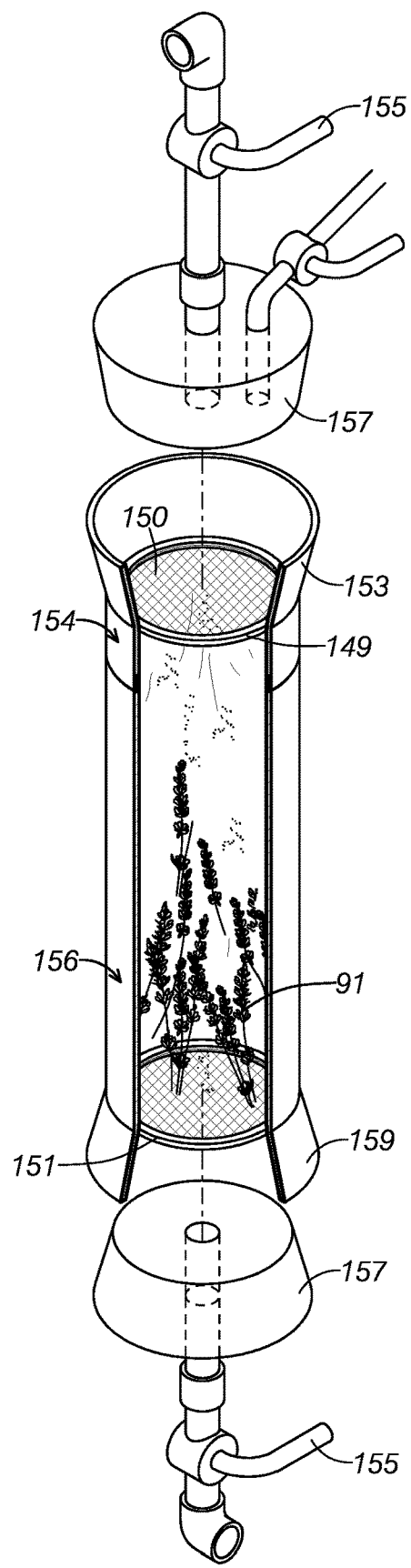
FIG. 2 is a perspective cutaway view of an example of a detachable canister included in the system shown in FIG. 1.

System 100 may be particularly adapted for using butane to extract essential oils from plant material. For example, FIG. 2 depicts system 100 using butane to extract essential oils from lavender plants. FIG. 2 illustrates lavender 91 contained within first detachable canister 150, being exposed to a solvent, defining liquid butane 92, within a canister of system 100.

As FIG. 2 shows, first detachable canister 150 is configured to store lavender 91 and liquid butane 92 to extract the essential oils from the source material in an extract solution, containing butane and lavender essential oil. After a predetermined period of time selected to effectively extracting essential oil from lavender plant materials, first detachable canister 150 is configured to output the contained extract solution.

After the predetermined period of time, the extract solution is directed to an extract container. The extract container is configured to heat the contained extract solution above the boiling point of the solvent to separate substantially purified post-extraction solvent from the extract solution. The evaporated post-extraction solvent is then stored to reclaim it for later use. After removing the post-extraction solvent from the extract container, the residual material in the extract container defines a distilled, high-purity essential oil of the source material.

After the solvent has been used to extract solute from the solvent, system 100 is configured to reclaim the used solvent for later use. As FIG. 1 illustrates, extract container 170 is connected in fluid communication with solvent collection container 115. Extract container 170 is configured to separate the solvent from the extracted solute, allowing system 100 to direct and collect the used solvent in solvent collection container 115. System 100 includes several features configured to increase the reclaim rate of post-extraction solvent, allowing system 100 to use solvent more efficiently than many conventional extraction systems.

As FIG. 1 shows, solvent source container 120 is connected in fluid communication with solvent compressor 130 and in fluid communication with solvent collection container 115. As FIG. 1 illustrates, solvent source container 120 includes a source container input 121 and a source container output 122. Source container input 121 is configured to fluidly receive solvent communicated from solvent collection container 115. For example, first pump 101 and second pump 102 may pump solvent contained in solvent collection container 115 as system 100 proceeds through an extraction cycle. Source container input 121 is additionally configured to restrict the passage of fluid back into the solvent collection container 115.

Source container output 122 is configured to direct solvent contained in the solvent source container 120 to solvent compressor 130 via a solvent source line 197. By directing fluid to solvent compressor 130, solvent source container 120 introduces the solvent in the current cycle of system 100's extraction process. In some examples, solvent source line 197 may include an internal filter. The internal filter may be used to remove impurities in the solvent prior to introducing the solvent to detachable canister system 140.

Because solvent source container 120 is configured to fluidly receive solvent from solvent collection container 115, solvent source container 120 may be refilled with post-extraction solvent collected by solvent collection container 115 during previous extraction cycles performed by system 100.

By directly reintroducing post-extraction solvent to solvent source container 120, system 100 is able to reclaim post-extraction solvent at a high rate. Further, the reclaimed solvent may be of a higher purity than fresh, commercially sourced butane. Butane often ships with an odorant, such as mercaptan or thiphiane. When using a solvent containing such an odorant, the extracted essential oil may include portions of the odorant. This results in a less desirable end product.

In some examples, solvent source line 197 may include a solvent filter within its fluid-transmissive interior, thereby passing solvent through the filter as it passes from solvent source container 120 to solvent compressor 130. In some examples, the solvent filter may define a 13-X molecular sieve configured for membrane filtration of the solvent as it passes from solvent source container 120 to solvent compressor 130.

The post-extraction solvent that has been processed and reclaimed by system 100 may have decreased levels of odorant compared to commercially available odorant-containing solvents. Accordingly, using reclaimed solvent may result in a purer, more desirable end product. In some cases, users may run a solvent purification cycle prior to extraction to remove such impurities. Such a solvent purification cycle may include processing and reclaiming commercially purchased butane through system 100 one time prior to extraction.

As FIG. 1 shows, solvent compressor 130 is in fluid communication with solvent source container 120. As FIG. 1 additionally illustrates, solvent compressor 130 is in fluid communication with first pump 101 and second pump 102, assuming appropriate valves are open. Solvent compressor 130 is configured to receive solvent from solvent source container 120.

Solvent compressor 130 is configured to compress, or "charge," the received solvent. In some examples, the compressor may be electrically powered, such as by plugging into an electrical outlet 89. In other examples, solvent compressor 130 may pressurize solvent using backflow pressure produced by first pump 101 and second pump 102.

In some examples, it is desirable to use a high-temperature liquid solvent for extraction. Solvent compressor 130 may be used to compress solvent to an extraction pressure, the extraction pressure selected to maintain solvent in a liquid state even when exposed to an elevated extraction temperature. After pressurizing the solvent, solvent compressor 130 is configured to introduce the pressurized solvent into detachable canister system 140.

As FIG. 1 shows, detachable canister system 140 is connected in fluid communication with solvent compressor 130. As FIG. 1 illustrates, detachable canister system 140 includes a plurality of detachable canisters, including a first detachable canister 150, a second detachable canister 163, and a third detachable canister 164. Detachable canister system 140 is configured to direct solvent from solvent compressor 130 to each detachable canister via a detachable canister line 181.

Detachable canister system 140 is configured to fluidly receive compressed solvent from solvent compressor 130. Detachable canister system 140 is further configured to direct to extract container 170 extract solution produced within attached canisters, the extract solution including both solvent and solute extracted from source materials contained in the canisters. Detachable canister system 140 is further configured to direct to extract container 170 any overflow solvent output by solvent compressor 130 and not received by a detachable canister.

As FIG. 1 illustrates, detachable canister system 140 is configured to direct fluid from solvent compressor 130 to each detachable canister. As FIG. 1 shows, detachable canister system 140 includes an input valve associated with each detachable canister. Each input valve controls fluid communication between solvent compressor 130 and the associated detachable canister. When an input valve is opened, solvent compressor 130 is configured to communicate contained compressed solvent to the associated canister.

As FIG. 1 shows, solvent compressor 130 is configured to communicate with each detachable canister individually. Accordingly, detachable canister system 140 allows a user to refill a selected canister as one or more of the other canisters remain closed and to continue extracting the solute from the contained source material.

As FIG. 1 shows, detachable canister system 140 is configured to direct the extract solution created in each detachable canister to extract container 170 via an extract mixture line 184. As FIG. 1 shows, detachable canister system 140 includes an output valve associated with each detachable canister. When an output valve is opened, the associated canister is placed in fluid communication with extract mixture line 184.

When placed in fluid communication, the associated canister is configured to output an extract mixture to extract container 170 via extract mixture line 184. A user may use the output valves to direct the extract mixture contained in an associated canister to extract container 170. In some examples, first pump 101 and second pump 102 are configured to cooperatively suck the extract mixture from the associated canister toward extract container 170.

As FIG. 1 illustrates, detachable canister system 140 additionally includes an overflow line 182 in fluid communication with solvent compressor 130, each detachable canister, and extract container 170. Overflow line 182 is configured to direct overflow solvent that does not make it from solvent compressor 130 to one of the detachable containers after charging. For example, overflow line 182 may be used to collect solvent trapped in detachable canister line 181 after filling one of the detachable canisters with solvent.

FIG. 2 illustrates an example detachable canister, first detachable canister 150, filled with solvent and source material. In FIG. 2, first detachable canister 150 is currently extracting the solute from the source material. As FIG. 2 illustrates, first detachable canister 150 includes a top portion 154, which may be screwingly attached to and detached from a bottom portion 156. When top portion 154 and bottom portion 156 are attached, they define a fluid-tight container configured to store solvent and source material during extraction.

As FIG. 2 shows, first detachable canister 150 may additionally or alternatively include a top mesh filter 149 and a bottom mesh filter 151. As FIG. 2 shows, top mesh filter 149 defines a perimetral gasket surrounding a mesh filter. The perimetral gasket is made of a food-grade nitrile, allowing first detachable canister 150 to be legally used to extract solute that may be used for food products. As FIG. 2 illustrates, top mesh filter 149 is configured to be slidingly inserted into the top of first detachable canister 150 to prevent sediment from inadvertently backflowing through the input of first detachable canister 150. The perimetral gasket is sized to partially compress within first detachable canister 150, thus frictionally supporting top mesh filter 149 in a substantially fixed position within first detachable canister 150.

In some examples, the filter of top filter 149 may define a stainless steel 200 mesh filter. In some examples, the gasket portion of top filter 149 may define food grade nitrile.

Bottom mesh filter 151 is substantially similar to top mesh filter 149, but is positioned proximate the bottom of first detachable canister 150. Accordingly, bottom mesh filter 151 is configured to prevent sediment from inadvertently flowing through the output of first detachable canister 150.

Because system 100 includes multiple canisters and each canister is removable, system 100 is able to extract solute in the connected, filled containers as other functions of system 100 continue to operate. For example, when one canister is attached and extracting, solvent compressor 130 may charge solvent for a second canister. Further, a user may be able to load a detached canister as solvent compressor 130 charges solvent, providing even greater parallelism.

As FIG. 2 shows, detachable canister system 140 includes, for each detachable canister, both an upper canister attachment device 153 and a lower canister attachment device 159. Each upper canister attachment device 153 and lower canister attachment device 159 is configured to selectively secure the associated detachable canister. As shown in FIG. 2, each upper canister attachment device 153 device includes a handle 155, which defines an over-center securing lever configured to be pulled to lock upper canister attachment device 153 in a substantially fixed position over the top opening of the associated canister. As FIG. 2 shows, each upper canister attachment device additionally defines a compressible, fluid-tight gasket 157 configured to be compressed against the associated canister when upper canister attachment device 153 is locked in a closed configuration. As FIG. 2 shows, upper canister attachment device 153 may be pulled away and spaced from the associated canister when the handle 155 is released.

As FIG. 2 shows, lower canister attachment device 159 is configured to slidingly receive the lower opening of an associated canister. As FIG. 2 illustrates, lower canister attachment device 159 includes a compressible, fluid-tight gasket 157. As FIG. 2 illustrates, a user may manipulate upper canister attachment device 153 to receive the associated canister such that the canister is engaged with both gaskets 157. When a user pulls handle 155 to position upper canister attachment device 153 in a locked configuration, both gaskets 157 are configured to compress to place the canister in fluid communication with both solvent compressor 130 and extract container 170. Similarly, both gaskets are configured to release when handle 155 is released. When handle 155 is released and upper canister attachment device 153 is pulled away from the associated canister, the canister can be slidingly removed from lower canister attachment device 159 to be removed from system 100.

As FIG. 1 illustrates, each detachable canister includes a heating pad 152 wrapped around its exterior. Each heating pad 152 is configured to receive electrical energy, such as by being plugged into electrical outlet 89, to heat the canister around which it is wrapped. Increasing the temperature can, in many cases, increase solvents' efficacy and efficiency in extracting the solute from a source material. The heating pads may be controlled by an electronic heating pad controller 78, which configures the heating pad to operate at a chosen temperature or intensity.

As FIG. 1 shows, extract container 170 is in fluid communication with detachable canister system 140, configured to receive extract solution output by the detachable canisters and any overflow solvent transmitted by overflow line 182. As FIG. 4 illustrates, extract container 170 includes a container input 172, a container output 174, and a lid 176.

Extract container 170 is configured to receive the extract mixture output by the detachable canisters. Extract container 170 is further configured to separate the post-extraction solvent from the extract mixture and output the post-extraction solvent for reclamation.

Container input 172 is configured to receive extract mixture in a liquid state from the detachable canisters. For example, FIG. 4 illustrates extract container 170 containing a liquid 72 containing both extract mixture and extracted essential oil. The extract mixture has been collected from detachable canister system 140 in the current cycle of system 100, whereas the extracted essential oil is the residual essential oil after reclaiming post-extraction solvent from a previous cycle of system 100.

Figure 4:
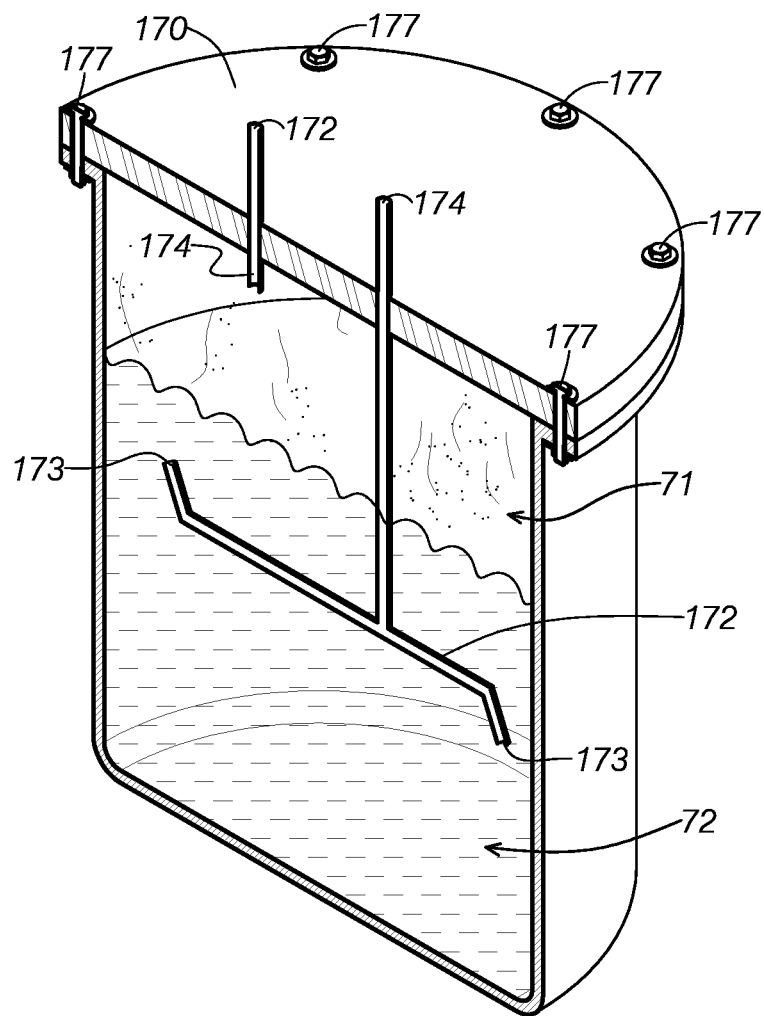
FIG. 4 is a cross-sectional view of the extract container shown in FIG. 3 taken along the line 4-4.

As FIG. 4 shows, system 100 includes features that are configured to restrict fluid from passing back into detachable canister system 140. As FIG. 4 shows, container input 172 is positioned below the midpoint of extract container 170. At this point, container input 172 will often be positioned below collected essential oils. Because container input 172 is often positioned within the collected liquid, extract container 170 directs gas, such as evaporated post-extraction solvent 71, toward container output 174 rather than the submerged container input 172.

Further, container input 172 includes angled open ends 173. The open ends 173 prevent liquid from being directed toward lid 176. By preventing liquid from contacting lid 176, extract container 170 provides a substantially clear view of the liquid contained in extract container 170. Further, pump 102 and pump 104 are configured to direct fluid toward container output 174 and away from container input 172.

Figure 3:
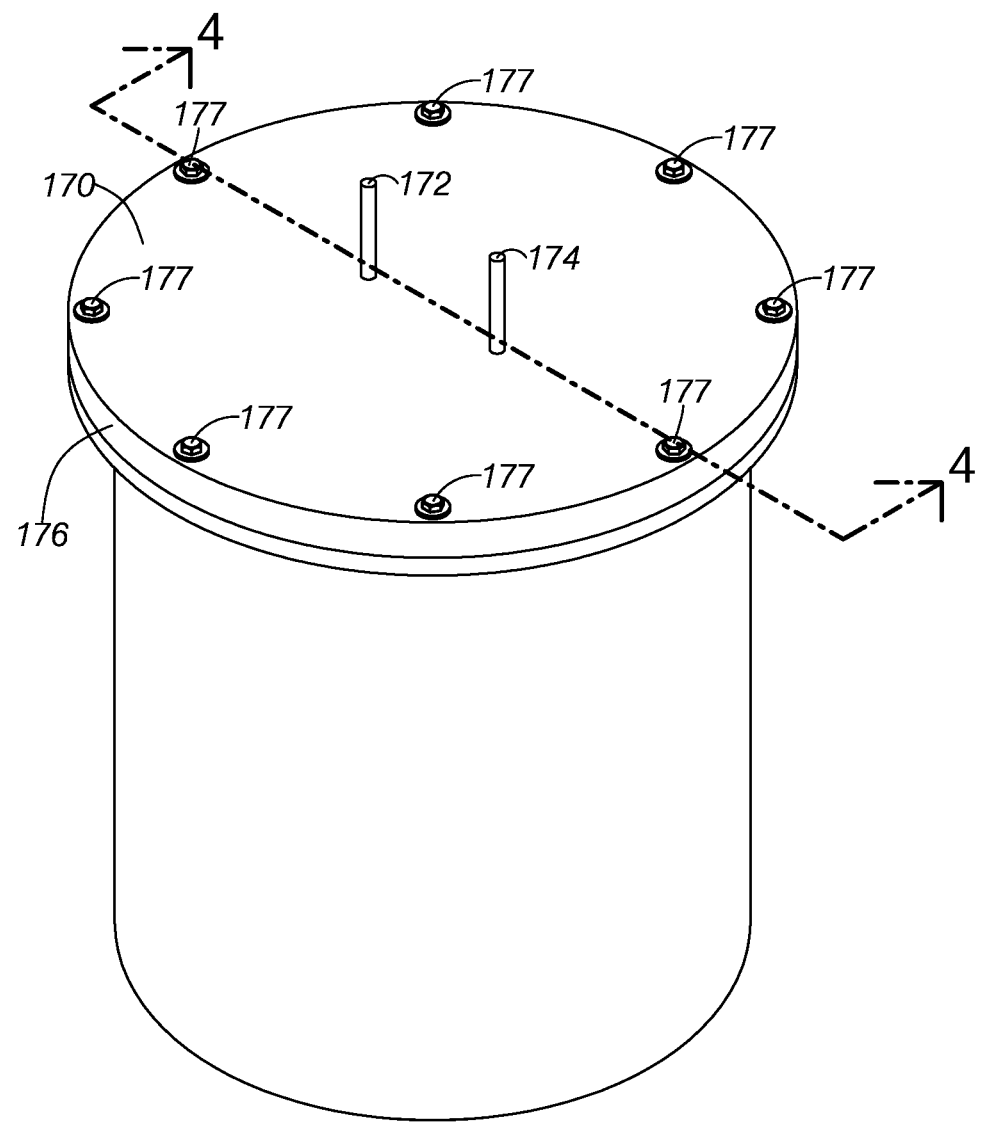
FIG. 3 is a perspective view an extract container included in the system shown in FIG. 1.

As FIG. 4 shows, container output 174 is configured to direct gas, such as evaporated post-extraction solvent 71, from extract container 170 to solvent collection container 115. As FIG. 3 illustrates, container output 174 is positioned above container input 172 and above the top of fluid collected in extract container 170. Because container output 174 is located in this elevated position, it is positioned to receive gas from extract container 170 as fluid remains in extract container 170. Because container output 174 is positioned to primarily receive gas from extract container 170, extract container 170 is configured to separate evaporated post-extraction solvent from extract mixture while leaving the extracted essential oils in extract container 170. This results in a pure product while reclaiming post-extraction solvent at a high rate.

Extract container 170 defines a pressure pot, configured to retain its structure at a wide range of pressure profiles. Namely, extract container 170 is configured to maintain its structure from −30 mmHg of vacuum pressure to 300 pounds per square inch of positive pressure. In typical working conditions, the amount of pressure applied to container 170 will range from −30 mmHg of vacuum pressure to 150 pounds per square inch of positive pressure. In particular, extract container 170 will often be between −30 to 0 mmHg of vacuum when receiving fluid from extract mixture line 184 and between 0 and 60 pounds per square inch of pressure when directing fluid to container output 174.

As FIGS. 3 and 4 show, lid 176 is detachably secured to the top of extract container 170. Lid 176 allows a user to view the contents within container 170 and is made from plexiglass. The thick Plexiglas construction of lid 176 provides sufficient rigidity and structural integrity to withstand the widely disparate pressure conditions often present in extract container 170. The lid may be made from any material configured to withstand anticipated operating pressures.

As FIGS. 3 and 4 show, lid 176 is fastened to the main body of container 170 by a series of 0.5 inch bolts 177. The bolts are each detachable, allowing lid 176 to be selectively removed. Further, the numerosity and strength of the bolts provide sufficient structural support to restrict lid 176 from being damaged or unintentionally removed under the pressure conditions typically encountered during operation.

As FIG. 3 shows, lid 176 includes ports through with container output 174 and container input 172 are spaced at a distance selected to retain the structural integrity of lid 176 under the pressure conditions typically encountered during operation.

As FIG. 1 illustrates, an extract container heating element 178 is thermally coupled with the contents of extract container 170, being positioned at the bottom of extract container 170. Heating element 178 defines an electrically powered heating pad rated at 500 Watts. Heating pad 152 is configured to heat the extract mixture to a distilling temperature to produce an evaporated portion of the solvent in extract container 170. The distilling temperature to which extract container 170 is heated is greater than the boiling point of butane and less than typical essential oil boiling points.

Heating element 178 may be powered by an electrical connection to electrical outlet 89. Additionally, the temperature or intensity of heating element 178 may be controlled by an electronic container heating element controller 79.

As FIG. 1 illustrates, system 100 includes a pressure release valve 185 and pressure release line 187, both in fluid communication with container output 174. Pressure release line 187 is in fluid communication with ambient air at a location in which it is safe to output flammable fluids. During operation, the pressure of the interior of extract container 170 may fall outside the bounds of desirable operating pressures. For example, pressure release valve 185 is configured to open pressure release line 187 upon extract container 170 exceeding 150 pounds per square inch of positive pressure or negative 30 pounds per square inch of vacuum pressure.

As FIG. 1 illustrates, first pump 101 and second pump 102 are connected in fluid communication with extract container 170. First pump 101 and second pump 102 are configured to direct fluid through system 100 in the direction indicated by arrows 98 and 99 shown in FIG. 1. For example, first pump 101 and second pump 102 are configured to cooperate to direct evaporated post-extraction solvent from extract container 170 to solvent collection container 115 over a container output line 188 and a solvent collection line 190. In some examples, a fan may be attached between first pump 101 and second pump 102 for cooling when system 100 is operational.

Because system 100 defines a closed loop system, first pump 101 and second pump 102 are cooperatively configured to direct fluid at a variety of stages of system 100 as long as any intervening valves are opened. For example, first pump 101 and second pump 102 may be configured to cooperate to draw solvent from solvent collection container 115 to solvent source container 120. Further, first pump 101 and second pump 102 are configured to cooperatively communicate at least a portion of post-extraction solvent evaporated within extract container 170 to solvent collection container 115.

Similarly, first pump 101 and second pump 102 may be configured to cooperatively direct extract solution output from the detachable canisters to extract container 170. In some examples, backflow pressure produced by first pump 101 and second pump 102 provides some or all of the pressure used by solvent compressor 130 to pressurize solvent prior to introducing it to the solvent containers.

First pump 101 and second pump 102 collectively produce a flow rate sufficient to accomplish each of the aforementioned functionalities. Some examples include more or fewer pumps connected in series. Additional pumps may provide additional pumping power, whereas fewer pumps may save on operating costs.

As FIG. 1 shows, solvent collection line 190 is configured to pass through condensing system 105 between second pump 102 and solvent collection container 115. As FIG. 1 illustrates, condensing system 105 includes a coolant pump 104, a first condenser column 107, a second condenser column 108, a coolant line 109, a coolant loop line 113, a first expansion valve 111, and a second expansion valve 112. Condensing system 105 is configured to cool post-extraction solvent pumped by first pump 101 and second pump 102 prior to the solvent reaching solvent collection container 115. By cooling the post-extraction solvent, condensing system 105 allows the post-extraction solvent to be stored and collected as a liquid.

Coolant line 109 includes a coolant defining a refrigerant selected to cool when evaporated. As FIG. 1 illustrates, coolant pump 104 is configured to direct the coolant contained in coolant line 109 in the direction indicated by arrow 96 and arrow 97.

As FIG. 1 illustrates, coolant line 109 is routed through second condenser column 108. After passing through second condenser column 108, coolant line 109 splits, with one branch being directed back to coolant pump 104 and the other branch being directed toward first condenser column 107. As FIG. 1 shows, coolant line 109 joins coolant loop line 113 in fluid communication after passing through second expansion valve 112.

Coolant line 109 is configured to absorb heat from the post-extraction solvent passing through solvent collection line 190 to cool the post-extraction solvent to a liquid state. Coolant line 109 and coolant loop line 113 additionally cooperate to continuously cool coolant pump 104 during operation.

Figure 5:
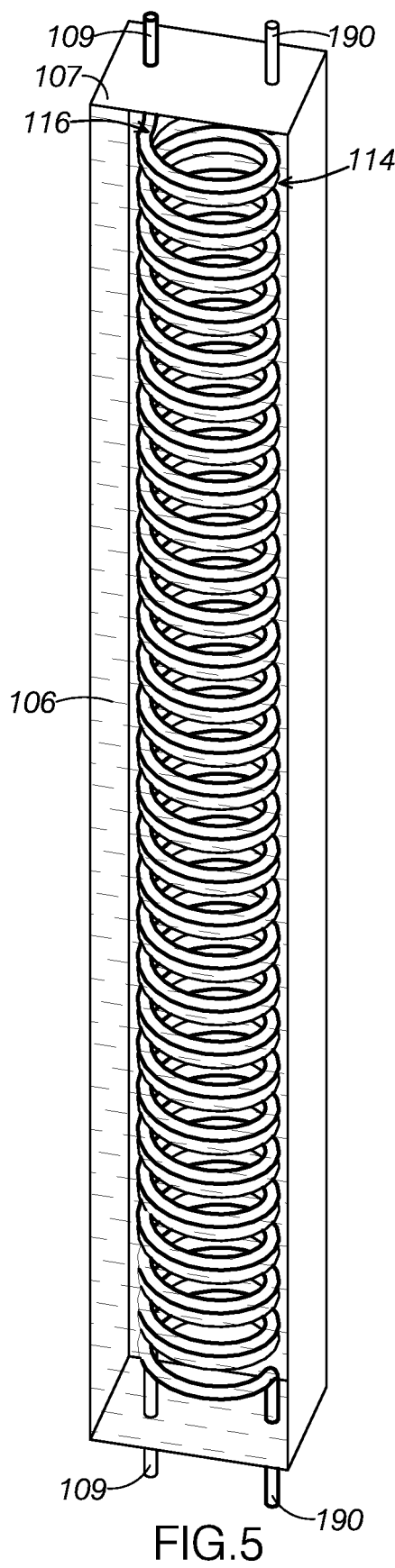
FIG. 5 is a perspective view of a condenser column shown included in the system shown in FIG. 1, the condenser column is shown with a front panel removed to show interior details.

As FIG. 5 illustrates, solvent collection line 190 defines a coiled portion 114 through first condenser column 107. Likewise, coolant line 109 defines a coiled portion 116 through first condenser column 107. As FIG. 5 shows, coiled portion 116 and coiled portion 114 are sufficiently close with one another for coolant line 109 and solvent collection line 190 to be thermally coupled through first condenser column 107. As FIG. 5 shows, first condenser column 107 is filled with a thermally conductive liquid 106, such as an antifreeze, which encourages rapid heat transfer between coolant line 109 and solvent collection line 190.

As FIG. 1 shows, coolant line 109 is connected in fluid communication with coolant loop line 113. Coolant loop line 113 is routed through second condenser column 108 and defines a coiled portion through second condenser column 108. Similar to the design of first condenser column 107, the coiled portion of coolant loop line 113 and a second coiled portion of coolant line 109 are engaged and thermally coupled with one another within second condenser column 108.

As FIG. 1 shows, the hydraulic circuit defined by coolant line 109 and coolant loop line 113 routes coolant pumped by coolant pump 104 through two expansion valves. Coolant passing through first expansion valve 111 in second condenser column 108 expands to vapor or a vapor/liquid mix, which draws heat from the second coiled portion of coolant line 109. This cools coolant line 109, particularly at its second portion. As FIG. 1 shows, a portion of this cooled coolant is reintroduced into coolant pump 104, thereby continuously cooling coolant pump 104 during operation.

Coolant passing through second expansion valve 112 as it returns to coolant pump 104 similarly expands to a vapor or vapor/liquid mix, which draws heat from solvent collection line 190 and the solvent passing therein. In many cases, second expansion valve 112 will expand coolant returning from coolant line 109, which draws heat from solvent collection line 190. This cools the post-extraction solvent passing through solvent collection line 190 to a liquid. Cooling the solvent and shifting it to a liquid decreases losses of recaptured post-extraction solvent and increases the efficiency of solvent collection container 115 in storing previously used solvent, thus increasing the recapture rate of system 100.

The coiling of fluid lines through both first condenser column 107 and second condenser column 108 increases the surface area throughout which the corresponding lines are thermally coupled. By maximizing this surface area, first condenser column 107 and second condenser column 108 are better able to transfer heat between the two paired lines. Further, the coiling of the lines increases the amount of time in which contained fluids are exposed to one another, further increasing the columns' cooling efficiency.

As FIG. 1 illustrates, solvent collection container 115 is connected in fluid communication with extract container 170 through solvent collection container 115 and solvent source container 120 via a storage container line 194. As FIG. 1 shows, solvent collection container 115 includes a collection container input 117 and a collection container output 118. Solvent collection container 115 is configured to collect post-extraction solvent separated from the distilled solute within extract container 170 and directed through solvent collection line 190.

Solvent collection container 115 is configured to direct collected solvent to solvent source container 120 upon collecting a maximum amount of collected solvent. In some configurations, solvent collection container 115 is configured to communicate collected solvent upon exceeding its storage capacity. In other examples, solvent collection container 115 is configured to communicate collected solvent upon the collected solvent reaching the end of collection container output 118. When the collected solvent reaches the second storage unit output, the suction force produced by first pump 101 and second pump 102 draws collected solvent through the second storage unit output to refill solvent source container 120.

Solvent collection container 115, solvent source container 120, and extract container 170 define volumes that are operatively paired with one another. Extract container 170, solvent source container 120, and solvent collection container 115 may, at times of operation, be configured to receive all of the fluid from the preceding fluidly connected elements. Accordingly, solvent collection container 115 and solvent source container 120 are sized to ensure sufficient storage space for any post-extraction solvent output by extract container 170.

To ensure sufficient headroom, the combined volume of solvent source container 120 and solvent collection container 115 may be equal to the volume of extract container 170. Likewise, extract container 170 may define a volume equal to the combined volume of solvent source container 120 and solvent collection container 115 to provide sufficient headroom to be filled with all of the solvent initially contained by solvent collection container 115 and solvent source container 120. In some examples, one or more of solvent source container 120, solvent collection container 115, and extract container 170 may be sized larger than needed, which may guarantee sufficient headroom.

Although solvent collection container 115 and solvent source container 120 are distinct containers in system 100, this disclosure contemplates that a single container could serve as both a solvent collection container and solvent source container.

Figure 6:
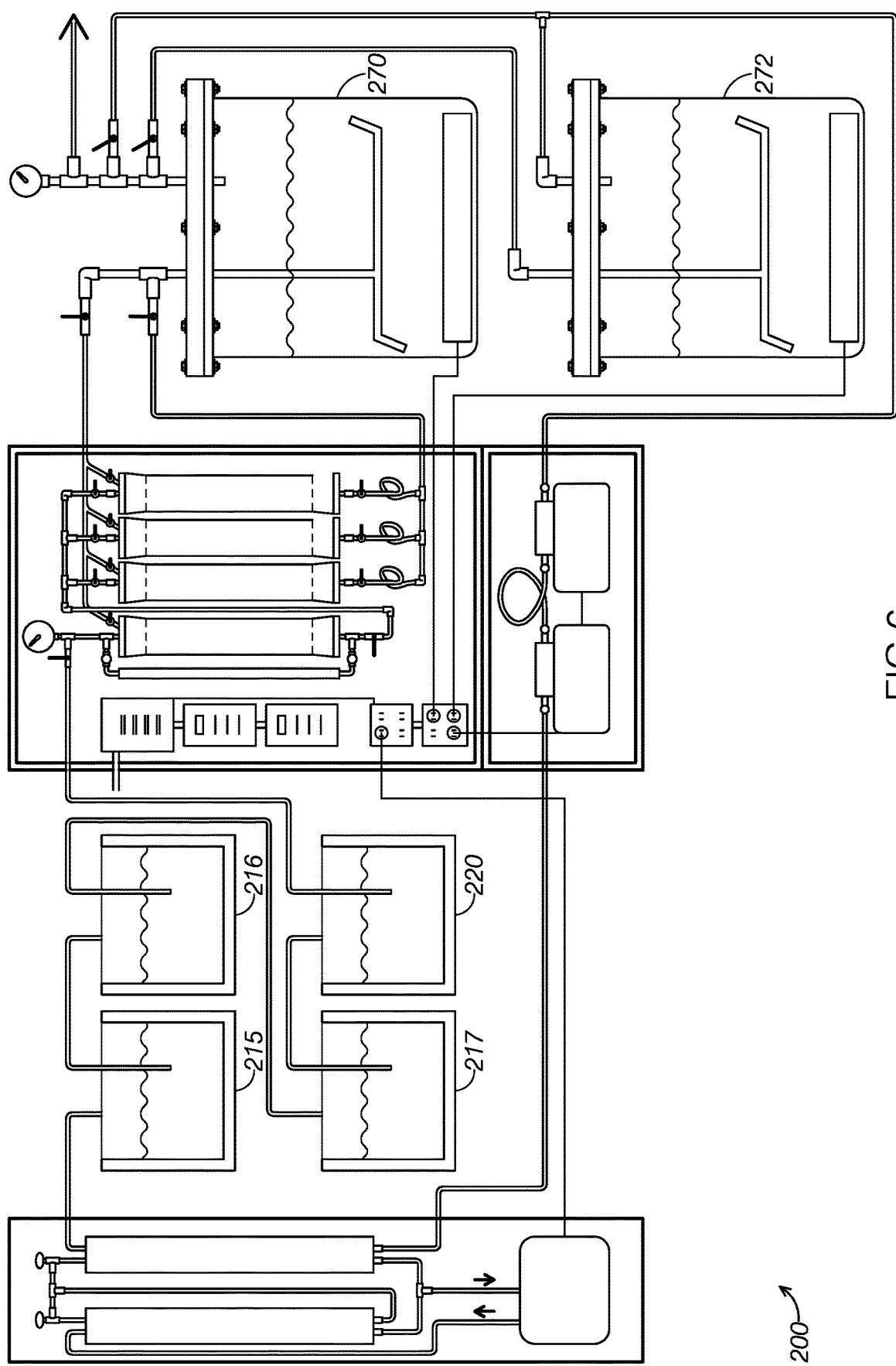
FIG. 6 is a diagrammatic view of a second example of a system for extracting solute from a source material.

As FIG. 6 shows, some examples may include more than one extract container. For example, the example system, system 200, includes both a first extract container 270 and a second extract container 272. As FIG. 6 illustrates, system 200 includes additional solvent collection containers, compared to system 100, to remain operatively paired with the two extract containers of system 200. Namely, system 200 includes a first solvent collection container 215, a solvent collection container 216, and a solvent collection container 217. System 200 additionally includes a solvent source container 220. The combined volume of first solvent collection container 215, solvent collection container 216, solvent collection container 217, and solvent source container 220 is operatively paired with the combined volume of first extract container 270 and second extract container 272.

Figure 7:
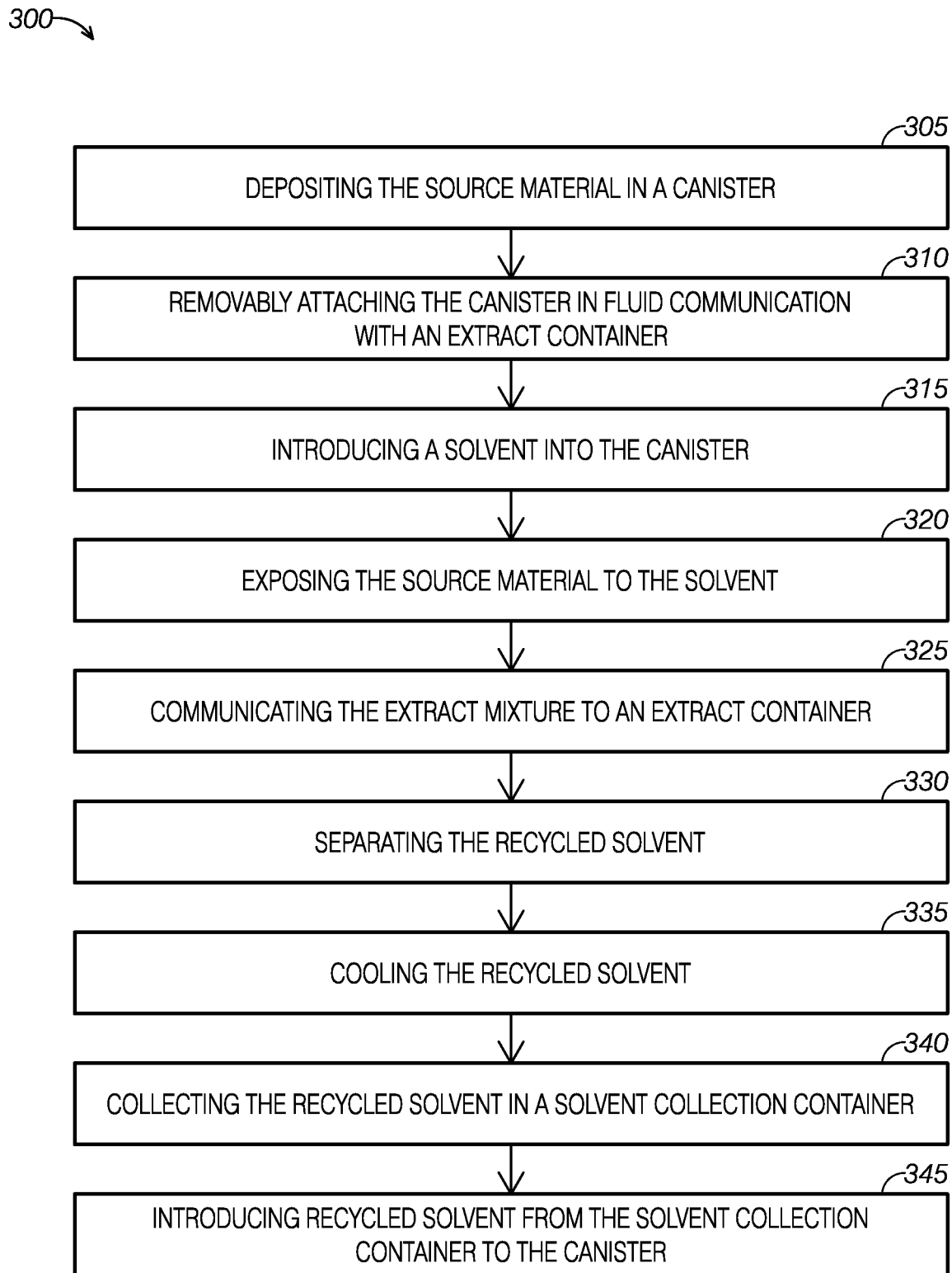
FIG. 7 is a flow diagram of an example of a method for extracting solute from a source material.

With reference to FIG. 7, an example of a method for extracting the solute from a source material, method 300, will now be described. Some of the steps of method 300 may be carried out using system 100 or other disclosed systems. Accordingly, the discussion of method 300 will reference system 100. Although this disclosure references system 100 in connection with method 300, method 300 is not required to be carried out on equipment similar to system 100, system 200, or other disclosed systems.

As FIG. 7 illustrates, method 300 includes depositing a source material including a solute in a canister at step 305, removably attaching the canister in fluid communication with an extract container at step 310, introducing a solvent into the canister at step 315, and exposing the source material to the solvent for a predetermined period of time at step 320, and communicating the extract mixture to an extract container at step 325. As FIG. 7 shows, method 300 further includes separating the recycled solvent at step 330, cooling the recycled solvent at step 335, collecting the recycled solvent in a solvent collection container at step 340, and introducing at least a portion of the recycled solvent from the solvent collection container to the canister at step 345.

As FIG. 7 illustrates, a source material including a solute is deposited in a canister at step 305. In some examples, the source material may define plant material from which essential oils may be extracted. For example, FIG. 2 illustrates first detachable canister 150 extracting essential oils from contained lavender 91.

In some examples, the source material is deposited in a substantially fluid-tight canister configured to selectively receive solvent and selectively communicate extract mixture created therein. For example, first detachable canister 150 is substantially fluid tight in a closed configuration but includes an input and output allowing fluid to be selectively input solvent and output created extract mixture.

In some examples, canisters may be configured to be detachably connected to an extraction system. In some such examples, the source material may be deposited detachable canisters when detached from its associated extraction system. For example, first detachable canister 150, as shown in FIG. 2, defines a selectively openable canister configured to be selectively attached and detached from system 100. Accordingly, first detachable canister 150 allows a user to load it with source material when it is detached from system 100.

Some examples include a plurality of detachable canisters that may be individually attached and detached from extraction systems. In such examples, the source material may be placed in one or more of the canisters while the other canisters continue normal operation. For example, system 100 includes three detachable canisters, first detachable canister 150, second detachable canister 163, and third detachable canister 164. First detachable canister 150, for example, could be removed and filled with the source material as system 100 continues the extraction/reclamation process with second detachable canister 163 and third detachable canister 164.

Some examples may include a detachable canister interface allowing canisters to be easily detached and reattached. In some examples, detachable canister interfaces are configured to receive the canister to support the canister in fluid communication with the solvent source container and an extract container. For example, system 100 includes detachable canister system 140 that allows each of the detachable canisters to be attached and detached. As FIG. 1 shows, each of first detachable canister 150, second detachable canister 163, and third detachable canister 164 are placed in fluid communication with solvent source container 120 and extract container 170 when attached.

In some examples, detachable canister interfaces are configured to release the canister in response to user manipulation. In some examples, such as system 100, detachable canister interfaces allow users to attach and detach canisters without any specific tools or hardware.

As FIG. 7 shows, the canister containing the source material is removably attached in fluid communication with an extract container at step 310. By placing the canister in fluid communication with an extract container, the canister is able to communicate created extract mixture to the extract container. The extract container may then be used to collect extracted essential oils and separate the recycled solvent from extracted essential oils collected therein.

As previously discussed, some examples include a plurality of simultaneously attached canisters. In some such examples, two or more of the simultaneously attached canisters may simultaneously be in fluid communication with a connected extract container. By placing each canister in fluid communication with the extract container, one or more canisters may simultaneously output contained extract mixture to a single connected extract container.

As seen in FIG. 7, the solvent is introduced into the canister at step 315. In some examples, the solvent is introduced into the canister by communicating, fluidly, solvent from a solvent source container to the canister. As previously discussed, some examples may include a plurality of detachable canisters. This disclosure contemplates introducing solvent into each canister independently, simultaneously with introducing solvent into one or more of the other canisters.

In some examples, introducing solvent into the canister includes pressurizing a charging portion of the solvent prior to introducing the solvent to the canister. In some examples, a charging portion of solvent may be pressurized when contained in a solvent compressor as one or more of the attached canisters contain an extracting portion of solvent being used to extract the solute from the source material. In system 100, for example, a user may pressurize a charging portion of the solvent in solvent compressor 130, designated for first detachable canister 150, as second detachable canister 163 and third detachable canister 164 each contain an extracting portion of the solvent and are extracting solute therewith.

Pressurizing the solvent is often a time-consuming process. Extracting solute in the canisters is also often time-consuming. As a result, the parallelism afforded by pressurizing solvent as other attached canisters continue the extraction process efficiently streamlines the pressurizing and extracting steps of disclosed methods.

In some examples, some or all of the solvent introduced into the canister may include recycled solvent reclaimed from a previous cycle of the disclosed methods. As will be discussed more below, some examples include a reclamation methodology that operates alongside disclosed extraction methodologies. By using reclaimed solvent, disclosed methods may use solvent particularly efficiently. In some examples, the solvent may automatically be collected and reintroduced. In some examples, solvent collection and reintroduction may occur simultaneously with other steps of the disclosed methods. Some examples may collect solvent in a plurality of solvent collection containers, such as system 200.

In some examples, introducing the solvent may include passing the solvent through a solvent filter as it passes from solvent source container 120 to solvent compressor 130. In some examples, the solvent filter may define a 13-X molecular sieve configured for membrane filtration of the solvent as it passes from solvent source container 120 to solvent compressor 130.

As FIG. 7 illustrates, the source material is exposed to the solvent for a predetermined period of time at step 320. The predetermined period of time in which the source material exposed is selected to substantially maximize the purity of extracted solvent. In some examples, the source material and solvent are exposed to heat and pressure conditions that may increase the efficiency with which solute is extracted from source materials. Soaking the source material in the solvent within an associated canister for 3-5 minutes has been found to be a surprisingly effective method exposing the source material to the solvent. In some examples, following the soak with a hydrocarbon wash of the associated canister has been found to result in a particularly high quality, pure product in subsequent extraction steps performed with that particular canister.

For example, it may be desirable to extract the solute from source materials at both high temperatures while solvent remains in a liquid state. This disclosure contemplates both heating the solvent when it is exposed to the source material and pressurizing the contained volume of solvent to a selected pressure to maintain the solvent in a liquid state when heated. By manipulating the pressure and temperature of the solvent, disclosed methods may extract solute at a higher purity and greater yield per unit of source material than conventional extraction methods.

As shown in FIG. 7, the created extract mixture is communicated to an extract container, the extract container in fluid communication with the extract mixture, at step 325. By communicating the extract mixture to the extract container, the extract container may collect and store extract for future use. In some examples, extract containers may be removed to use or store collected extract.

In some examples, the extract container may define a negative pressure prior to receiving extract mixture. The created extract mixture may be communicated to the extract container by opening a fluid communicative path between a canister containing created extract mixture and the extract container. For example, system 100 allows a user to manipulate the output valve of detachable canister system 140 associated with a container containing created extract mixture to open a fluid line between the associated canister and extract container 170.

As FIG. 7 shows, the recycled solvent is separated at step 330. Separating the recycled solvent may include including heating the container to evaporate the recycled solvent. Heating the container to evaporate the recycled solvent may include heating the container to a solvent extraction temperature. The solvent extraction temperature of the container may be greater than a boiling point of the solvent and less than a boiling point of the solute. By raising the temperature of the extract mixture above the solvent's boiling point and below the boiling point of essential oils, the solvent is separated from the extract mixture as a gas. The evaporated solvent may output independently of any contained essential oil or other extract.

In some examples, users may discard the contents of an extract container after evaporating the recycled solvent. In some examples, the contents of the extract container may include odorants or other impurities that may remain in the extract container after evaporating the recycled solvent. As a result, the recycled solvent may have increased purity compared the input solvent. Users may discard these impurities to ensure that they do not end up in any end product produced by subsequent extraction/reclamation cycles.

In some examples, the solvent may define butane. In such examples, heating the container to evaporate the solvent may include raising the temperature within the container above butane's sea level boiling point of about 30.8 degrees Fahrenheit while maintaining the temperature within the container to below typical boiling points of water and/or essential oils.

In some examples, separating the recycled solvent includes receiving the evaporated recycled solvent through a container output opening. In some examples, one or more fluidly-connected pumps may suck evaporated recycled solvent through the container output opening. As previously discussed, this disclosure contemplates extract containers that remain structurally stable at negative pressures. Attached pumps may be configured to extract substantially all of the evaporated recycled solvent contained in an extract container and leave the extract container with a negative pressure. By leaving the extract container with a negative pressure, the pumps additionally prepare the extract container to later receive additional extract mixture from one or more attached canisters.

In some examples, the evaporated recycled solvent is positioned above any liquid extract mixture contained in the extract container. For example, extract container 170 includes container output 174 positioned near the top of extract container 170 and above any contained extract. In some examples, users may periodically empty the extract to ensure that the container output opening remains above any contained extract. For example, the extract container may be removed and contained extract may be stored in an alternative container. To ensure the container output opening remains above the contained extract, the container may be periodically emptied prior to the extract container accumulating sufficient extract to reach the container output opening.

As seen in FIG. 7, the recycled solvent is cooled at step 335. In some examples, as is seen in system 100, the recycled solvent is thermally coupled with a solvent for a portion of the time after the recycled solvent leaves an extract container. In some examples, the recycled solvent is cooled prior to collecting the recycled solvent in the solvent collection container.

In some examples, the recycled solvent is directed through a solvent collection line and the recycled solvent is thermally coupled with a coolant along at least a portion of the solvent collection line. In some examples, the coolant is directed through a coolant line which is engaged with the solvent collection line over at least a portion of its length. For example, coolant line 109 is configured to carry coolant and is engaged with solvent collection line 190 through first condenser column 107. Because solvent collection line 190 is engaged with coolant line 109 and each line is constructed of thermally conductive material through first condenser column 107, coolant line 109 is thermally coupled with solvent collection container 115 through first condenser column 107.

In some examples, the coolant is directed through a fluid-transmissive coolant loop. The coolant loop may be configured to both output and receive coolant from the coolant line. For example, FIG. 1 illustrates an example coolant loop line, coolant loop line 113, which is configured to output and receive coolant from the coolant line at a single junction.

The coolant loop may additionally or alternatively define an expansion valve configured to expand and cool the coolant in the coolant loop. Additionally or alternatively, the coolant loop line may be engaged with the coolant line over at least a portion of its length, thereby thermally coupling the coolant loop and the coolant line over a portion of their lengths. By expanding the coolant in the coolant loop, the coolant loop includes a coolant that may be cooler than the coolant in the primary coolant line. By thermally coupling the coolant loop with the coolant line, the coolant loop may, in effect, cool the coolant in the coolant line.

FIG. 1 illustrates an example fluid circuit including a coupled coolant loop and coolant line. As previously discussed, coolant line 109 is thermally coupled with solvent collection line 190. As FIG. 1 shows, coolant line 109 is connected to both input and output to coolant loop line 113 at a single junction. Accordingly, system 100 is configured to allow coolant to be directed through coolant line 109 and is configured to direct at least a portion of the coolant in the coolant line 109 through coolant loop line 113.

As FIG. 1 shows, coolant loop line 113 includes first expansion valve 111 which is configured to expand and cool coolant contained in coolant loop line 113 prior to directing coolant in coolant loop line 113 through second condenser column 108. As previously discussed, coolant loop line 113 is thermally engaged with coolant line 109 through second condenser column 108. By expanding coolant contained in coolant loop line 113 and thermally coupling coolant loop line 113 and coolant line 109 immediately downstream of this expansion, coolant loop line 113 is configured to cool coolant line 109 through second condenser column 108.

As illustrated in FIG. 7, the recycled solvent is collected in a solvent collection container in fluid communication with the extract container at step 340. In some examples, the solvent collected by the solvent collection container is fluidly communicated from an extract container. In some examples, the recycled solvent is cooled to a liquid state prior to collection in the solvent collection container.

In some examples, the collected solvent is automatically output from a solvent collection container upon the solvent collection container collecting a maximum amount of collected solvent. In some examples, the automatically output collected solvent is input into a solvent source container in fluid communication with the associated solvent collection container. For example, solvent collection container 115 is configured to output collected recycled solvent to solvent source container 120 upon collecting a maximum quantity of collected recycled solvent.

In some configurations, solvent collection containers are configured to communicate collected solvent upon exceeding its storage capacity. In other examples, solvent collection containers are configured to automatically communicate collected solvent upon the collected solvent reaching the end of a collection container output positioned within the solvent collection container.

In some examples, collecting the recycled solvent includes displacing, with a pump, evaporated recycled solvent from the extract container to the solvent collection container. For example, first pump 101 and second pump 102 are configured to, in certain configurations, draw collected solvent from extract container 170 to solvent collection container 115.

In some examples, collecting the recycled solvent includes displacing, with a pump, recycled solvent from solvent collection containers to solvent source containers or canisters. For example, first pump 101 and second pump 102 are configured to, in certain configurations, draw collected solvent from solvent collection container 115 to solvent source container 120. First pump 101 and second pump 102 may be further configured to draw reclaimed solvent in the solvent source container 120 to one or more connected detachable canisters containing source material.

In some examples collecting the recycled solvent includes sealing the solvent collection container when the solvent collection container contains at least a portion of the recycled solvent and detaching the solvent collection container. In some examples, the solvent collection container may be sealed when it contains a predetermined quantity of the recycled solvent. Upon being sealed, solvent source containers containing reclaimed solvent may be detached and stored for later use. By allowing removal and storage of solvent collection containers and/or solvent source containers, users may store purified, reclaimed solvent for use in future use. Because of the disclosed purification features, the recycled solvent may be of a greater purity than many commercially available solvents.

In some examples, the recycled solvent is collected in an additional solvent collection container in fluid communication with the extract container. Additional solvent collection containers may be useful, for example, when additional or larger extract containers are used, as they may provide the increased headroom required when using additional or larger extract containers. In some such examples, the second solvent container may be operatively paired with the extract container. In some examples, solvent containers and extract containers may be operatively paired by defining a substantially similar total solvent container volume that is consistent with or equal to the total extract container volume. System 200, for example, includes a supplemental extract container paired with a supplemental solvent collection container.

As shown in FIG. 7, recycled solvent from the solvent collection container is introduced into the canister at step 345. In some examples, introducing at least a portion of the recycled solvent from the solvent collection container to the canister includes directing at least a portion of the recycled solvent from the solvent collection container to a solvent source container prior to reaching a canister. By reintroducing recycled solvent, disclosed methods efficiently re-use reclaimed solvent from previous extraction/reclamation cycles. Because used solvent is not simply discarded, disclosed methods provide robust economic and ecological efficiency.

In some examples, the recycled solvent contained in solvent collection container is displaced into the solvent source container upon the solvent collection container collecting a predetermined quantity of recycled solvent. In some examples, the solvent collection container is configured to introduce such received recycled solvent to the canister in future styles, instead of adding additional solvent. For example, solvent source container 120 is configured to direct new solvent and/or solvent received from solvent collection container 115 to detachable canister system 140.

Figure 8:
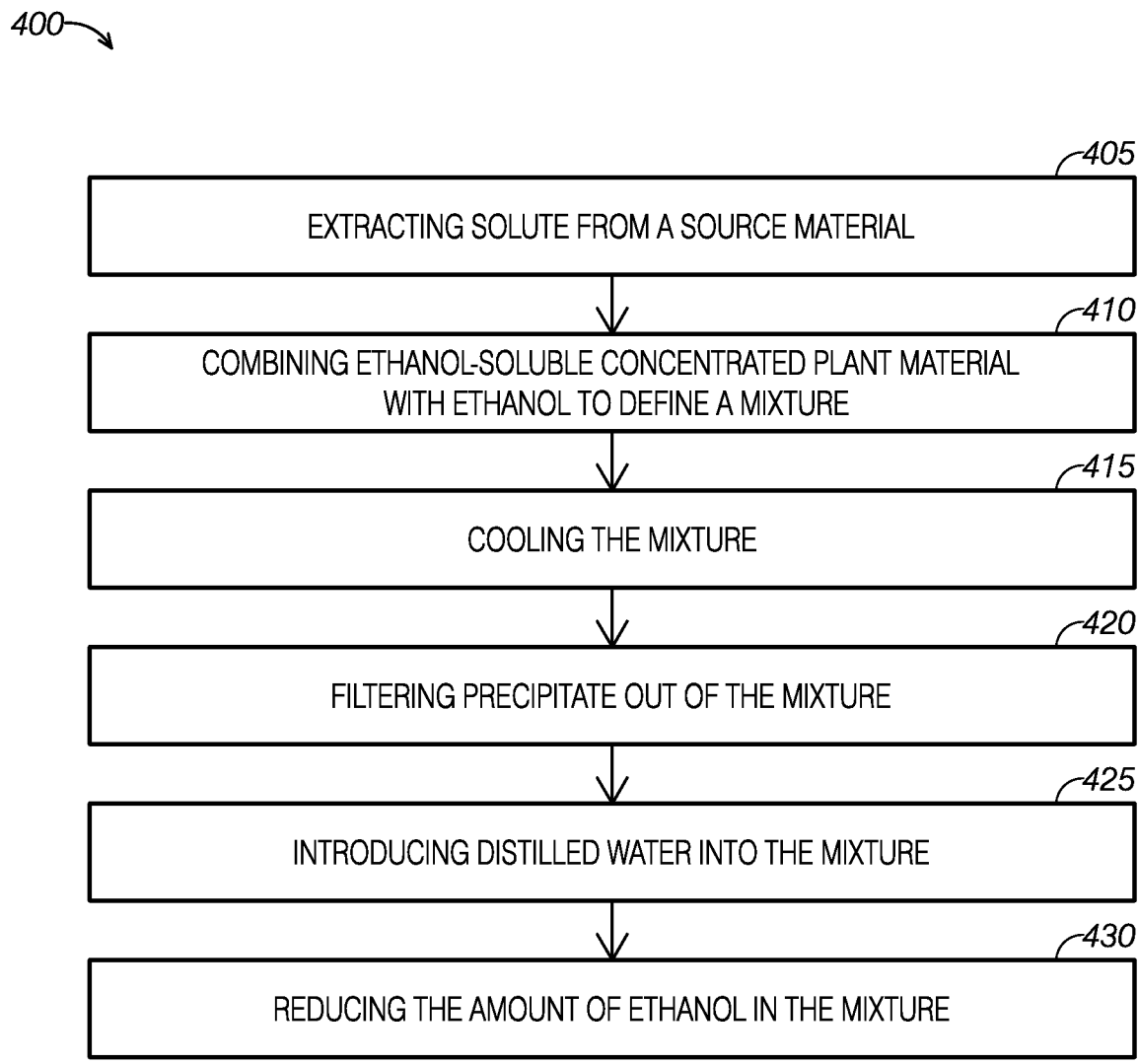
FIG. 8 is a flow diagram of an example of a method for creating a mixture of concentrated plant material and a substantially water-based mixture.

With reference to FIGS. 8-11, an example of a method for creating a concentrated plant material solution for use in an electronic cigarette, method 400, will now be described. As FIG. 8 shows, the method 400 may include extracting solute from a source material at step 405. The method 400 may include combining alcohol-soluble, water-insoluble concentrated plant material with alcohol to define a mixture at step 410. In one example, the alcohol may be ethanol. The method may include cooling the mixture below a predetermined precipitate removal temperature at step 415. The method may include filtering precipitate out of the mixture at step 420. The method may include introducing distilled water into the mixture at step 425. The method may include reducing an amount alcohol in the mixture until the mixture comprises a threshold amount of a liquid (such as the water) and the concentrated plant extract step 430. For example, the amount of alcohol in the mixture may be reduced until the mixture has a viscosity compatible for use with electronic cigarettes. In one embodiment, the source material may be material from the Kingdom Plantae. In another example, the material from the Kingdom Plantae may include phylum, divisions, or organisms that are seed plants. For example, the seed plants may be flowering plants, conifers, ferns, mosses, green algae, and so forth. In another example, the source material may be green plants or Viridiplantae (L). In another embodiment, the extracted solute or compound may be a water-insoluble, alcohol soluble compound from the Kingdom Plantae. The water-insoluble, alcohol soluble compound may be a pharmaceutically-active compound. For example, the water-insoluble, alcohol soluble compound may be a terpene compound, a terpenoid compound, a phenolic compound, a terpenophenolic compound, and/or a terpenoresorcinolic compound. The type of source material and the type of extracted solute is not intended to be limiting and may vary. The solutes may be prepared for dilution and use in electronic cigarettes or electronic vaporizers.

In another embodiment, the extracted compound may include multiple extracted compounds from the source material. For example, the extracted compound may include approximately 60 percent or more terpenoid compounds and one or more other water-insoluble, alcohol soluble compounds used to form a mixture.

The extracted compound may have different phases. In one embodiment, the extracted compound may be in a solid phase. In another embodiment, the extracted compound may be in a liquid phase. In another embodiment, the extracted compound may be in a gas phase. In another embodiment, the extracted compound may be in a micelles phase. An extracted compound in the micelles phase may be a compound with an aggregate or supramolecular assembly of surfactant molecules dispersed in a liquid colloid. For example, the extracted compounds may be amphiphilic in nature.

When the extracted compound is a terpenoid solute, a phenolic solute, a terpenophenolic solute, or a terpenoresorcinolic solute, the extracted compound may spontaneously form insoluble micelle complexes when brought into contact with an aqueous environment. For example, in the presence of solvents containing varying amounts of water, a micelle mixtures may coexist as in water-octanol partitions. In this example, the micelle mixtures may imply multimer aggregates of solutes, water, and solvents resulting in nanometer or micron-sized particles coexisting in a dynamic equilibrium with a bulk phase solvent. The complex, amphiphilic nature of the compounds in solution may be a water-based ethanol soluble, water-insoluble compound. In one example, the water-based ethanol soluble may be 95 percent soluble and the water-insoluble compound may be 40-100 percent insoluble.

In one embodiment, the extracted compound may be isolated and purified as a volatile compound of varying viscosity. In one example, the volatile compound may be a volatile oil. The volatile oil may be eaten or heated to produce a vapor for inhalation. In another example, the volatile compound may be used in aromatherapy. The volatile compound may come from the tea tree which belongs to the Myrtaceae family and include *Melaleuca alternifolia, M. cajuptii; M. viridflora* and/or *M. quiquenervia* vividflora. The Myrtaceae family may include cajeput, niaouli, clove, eucalyptus and/or myrtle. Oils isolated from the Myrtaceae family plants may be used in aromatherapy and/or for anti-infectious and anti-microbial applications. The tea tree oil may include terpinen-4-ol, alpha-terpineol, cineole, pinene, alpha terpene, beta-caryophyllene and/or cymene.

In another embodiment, the extracted compound may be a terpenoid class solute that is extracted from the family of Plantae Ericaceae. Ledol a diterpene and grayanotoxin of Plantae Ericaceae. The Plantae Ericaceae may be cyclic diterpenes that are sodium channel blockers. The terpenoid class solute may be relatively easily extracted and purified for vaporization. The grayanotoxins may be isolated from rhododendrons. The Ledol may be found in the Ericaceae, a *Rhododendron* sp., or a Myrtaceae and may be a pharmacological agent in labrador tea or Indian teas of North American. The Ericaceous kinnikinnick may be a bearberry, *Arctostaphylos uva-ursi* (L.) may include the terpenoid, ericolin and/or volitile grayanotoxins.

In another embodiment, the extracted solutes may be Family Cannabaceae or hemp plants. The hemp plants may include *Cannabis sativa, C. indica* and *C. ruderalis*, and so forth. The *Cannabis sativa* L. may be include different terpene compounds, terpenoid compounds, phenolic compounds, terpenophenolic compounds, and/or terpenoresorcinolic compounds. *Cannabis* sp. may be annual, dioecious herbs.

Naturally occurring cannabinoids (phytocannabinoids) may be biosynthetic terpenophenolic-terpenoresorcinolic compounds produced by the plant family Cannabanaceae. The Plantae Terpenophenolics and Terpenorescorcinolics may be produced from the enzymatic condensation of alkylresorcinolic or alkylphenolic and monoterpenoid molecular moieties and form the cannabinoid family of compounds. This terpenoid family of plant-derived cannabinoids (i.e., phytocannabinoids) may interact with human CB1 and CB2 receptors and may cause biological activities.

In one example, the extracted compounds may be purified by winterization. The winterization may precipitate and separate unwanted lipids using a filtration device or a centrifuge device. The extracted compounds may be further purified by separation procedures, such as column chromatography or short path distillation. The winterization and separation of an extracted compound may produce an oil with a defined purity level. For example, the winterization and separation of an extracted compound may produce an oil that is approximately 80-90 percent pure. The purified extracted solute may be relatively highly viscous and may be diluted with a solvent to provide a usable solute for electronic cigarettes or electronic vaporizers.

In one embodiment, the extracted solutes may be vaporized in conjunction with cannabinoids. The cannabinoids include a tetrahydrocannabinolic acid (THCa) compound, a cannabidiolic acid (CBDa) compound, a cannabinolic acid (CBNa) cannabichromenic acid (CBCa) compound, a tetrahydrocannabinol (THC) compound, a cannabinol (CBN) compound, a cannabidiol (CBD) compound, a cannabichromene (CBC) compound, a cannabigerolic acid (CBGA) compound, a cannabigerol (CBG) compound, a tetrahydrocannabivarinic acid (THCVA) compound, a tetrahyrrocannabivarin (THCV) compound, and so forth. In reference to plant extracts, the cannabinoids may be isolates.

In one embodiment, the extracted compounds may be vaporized in conjunction with cannabinoids. The vaporized extracted compounds and cannabinoids may be inhaled by a user to produce a phenomenon referred to as an entourage effect. For example, the inhaled extracted solutes and/or cannabinoids may produce physiological activities that include agonist and antagonist (partial agonist) activities on Cannabinoid receptors (CB1,CB2), orphan (e,g., GP55) receptors, transient receptor potential ion-channel binding sites (TRP receptors), binding sites of Calcium, Sodium and Potassium channels, Serotonin (5HT) receptors, and so forth. The receptor or binding sites may be referred to as lipid signaling systems of the human brain and immune systems of a user. These cannabinoid actions are often modulated by terpenes endogenous to the Cannabinacea family.

In another embodiment, endogenous terpenes of *cannabis* may be co-extracted with cannabinoids as water-insoluble, alcohol soluble moieties. Terpenes may be found in Cannabaceae extracts. The Cannabaceae extracts may include myrcene, lomonene, caryophyllene, pinene, terpineol, borneol, linalool, eucalyptol, nerolidol, and so forth. In reference to plant extracts, the terpenes may be referred to as isolates.

The endogenous terpenes may produce a rich flavor for inhaled extracted compounds and/or cannabinoids associated with the aromas of vaporized cannabinoids. The terpenes may produce pharmacological actions on diverse biological systems such as the cardiovascular system, the immune system, and/or the endocrine system of a user that inhaled the vaporized extracted solutes and cannabinoids. When vaporized and inhaled, the terpenes in conjunction with cannabinoids may produce simultaneous and cooperative physiological effects that modify the cannabinoid actions. The modified cannabinoid actions may also be referred to as the entourage effect.

Method 400 produces a concentrated plant material end product solution that is compatible with electronic cigarettes. The end product solution produced by method 400, and other disclosed methods, allows users to effectively vaporize ethanol-soluble concentrated plant material in electronic cigarettes. In particular, the disclosed methods produce end product solutions of ethanol-soluble, water-insoluble concentrated plant material that are primarily in solution with water and define relatively low ethanol concentrations. Further, the disclosed methods produce end product solutions that are relatively free of additional or alternative impurities.

In one example, the extraction and preparation of cannabinoid and terpene compounds for electronic vaporization may be referred to as a botanical derived substance (BDS), a concoction, an elixir, a tincture, or an extract used with electronic cigarettes or electronic vaporization. In one embodiment, the cannabinoids may be pure isolates with a purity level of approximately 98-100 percent. In another embodiment, the cannabinoid and extracted compounds may be combined to produce different mixtures with different purity levels and concentrate levels, also referred to as admixtures. In one example, the purity level of the cannabinoid may range from approximately 0.01 percent pure to approximately 100 percent pure. In another example, the extracted compounds may range in concentration levels from approximately 0.01 percent concentrate to approximately 100 percent. The cannabinoids and/or extracted compounds may be extracted at various purity levels and concentration levels to form various water-based, ethanol soluble, water-insoluble mixtures that are concentrated plant material (pharmaceutically active, BDS) for use with electronic vaporization and electronic cigarettes. The concentrate levels may be changed to adjust a viscosity, solution, and micelle disruption of the mixture.

The disclosed end product solutions define several characteristics that support their compatibility with electronic cigarettes. For example, a compatible end product solution should define an effective ratio of plant material to water. The efficacy of this ratio is based on the electronic cigarette being able to vaporize the solution at the selected concentration and the electronic cigarette vaporizing a suitable quantity of plant material per inhalation. This disclosure provides methods that allow users to control the concentration of plant material and water in an end product solution to define an effective and desired ratio of plant material.

Further, compatible end product solutions should include a relatively small concentration of ethanol. Because electronic cigarettes will vaporize ethanol when the concentrated plant material is used, too high of ethanol concentrations may result in end-product solutions that produce a poor taste when vaporized. Further, end-product solutions with too much ethanol may unintentionally alcoholically inebriate end-users when used.

In some examples, particular plant materials define ranges of effective concentrations. In such examples, a compatible desired concentration may be selected from the range of effective concentrations for a particular combination of ingredients. Indeed, different plant material concentrations may result in wildly different, yet effective, end-products.

As FIG. 8 shows, solute is extracted from a source material to produce an ethanol-soluble, water-insoluble, concentrated plant material at step 405. In some examples, the solute is mixed with an oil base to define an essential oil. In some examples, method 300 or other additional or alternative methods may be used to extract the solute from the source material. In some examples, systems such as system 100 and/or system 200 may be used to extract the solute from the source material.

In some examples, ethanol-soluble, the water-insoluble, concentrated plant material is in solution with a solvent. In some examples, the solvent is a hydrocarbon. For example, concentrated plant material may be in solution with butane, as is described in system 100, system 200, and method 300. While the end-product essential oil produced in these systems and methods may serve as the concentrated plant material, the butane-plant material solution produced at intermediate stages of these systems and methods may also serve as the concentrated plant material. Other suitable solvents include alcohols, methyl chlorate, and carbon dioxide.

Figure 9:
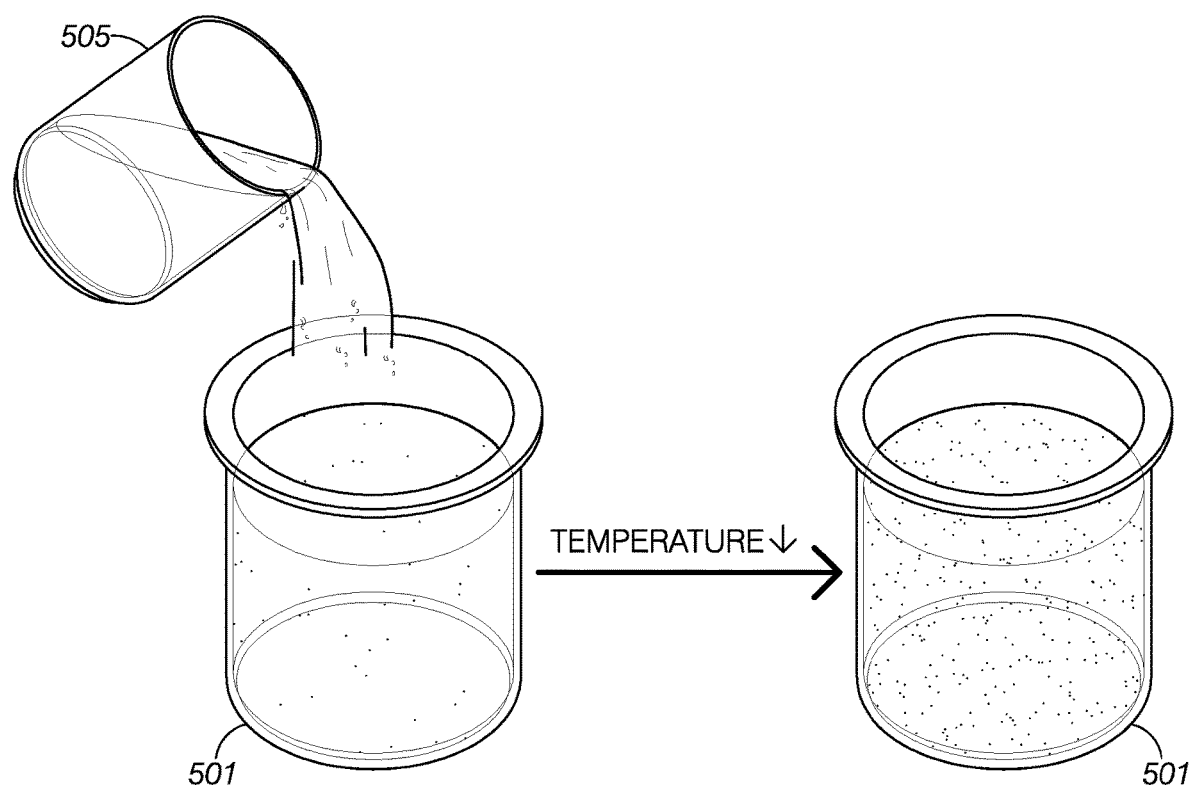
FIG. 9 illustrates a mixture of plant material and ethanol-soluble, water-insoluble concentrated plant material and ethanol being cooled.
Figure 10:
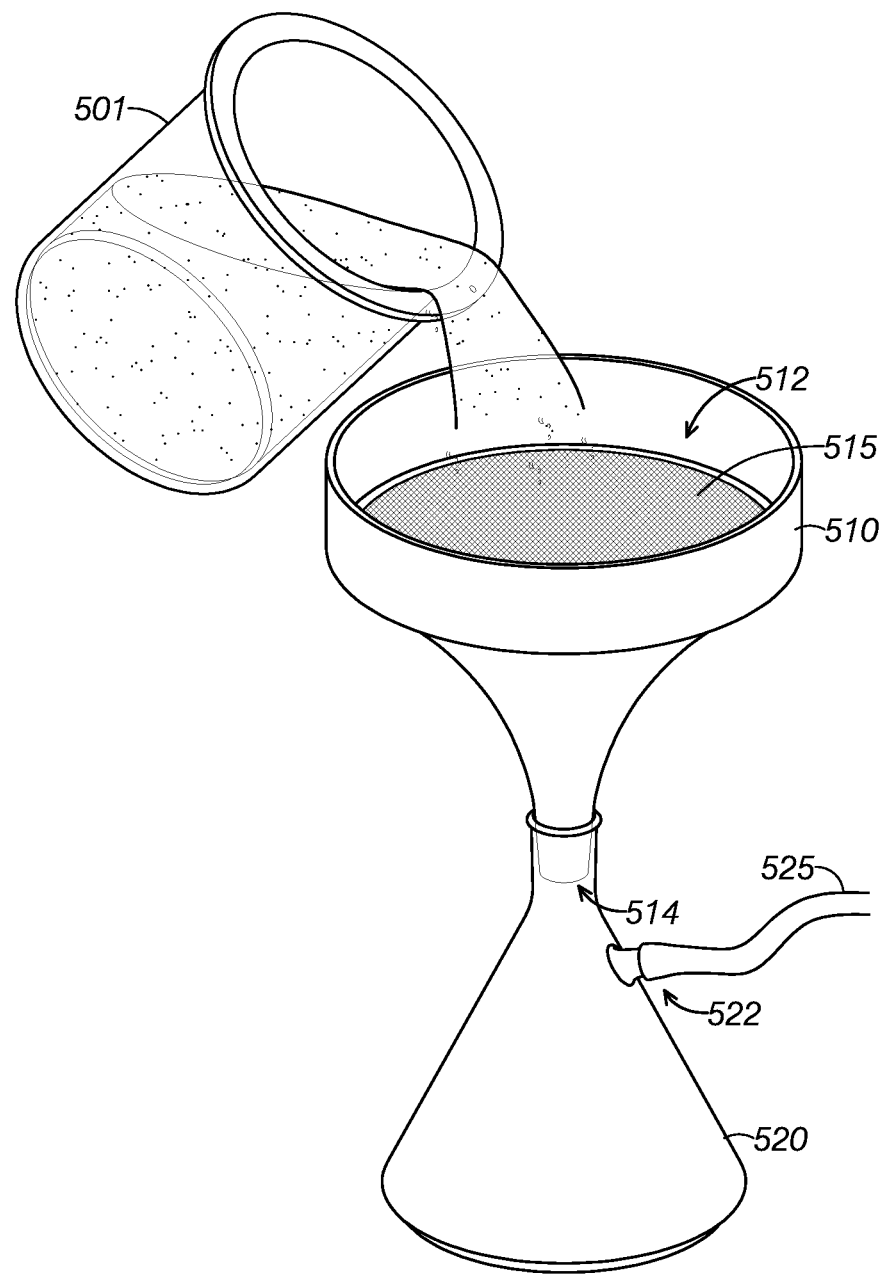
FIG. 10 illustrates the cooled mixture shown in FIG. 9 being directed through a filter.
Figure 11:
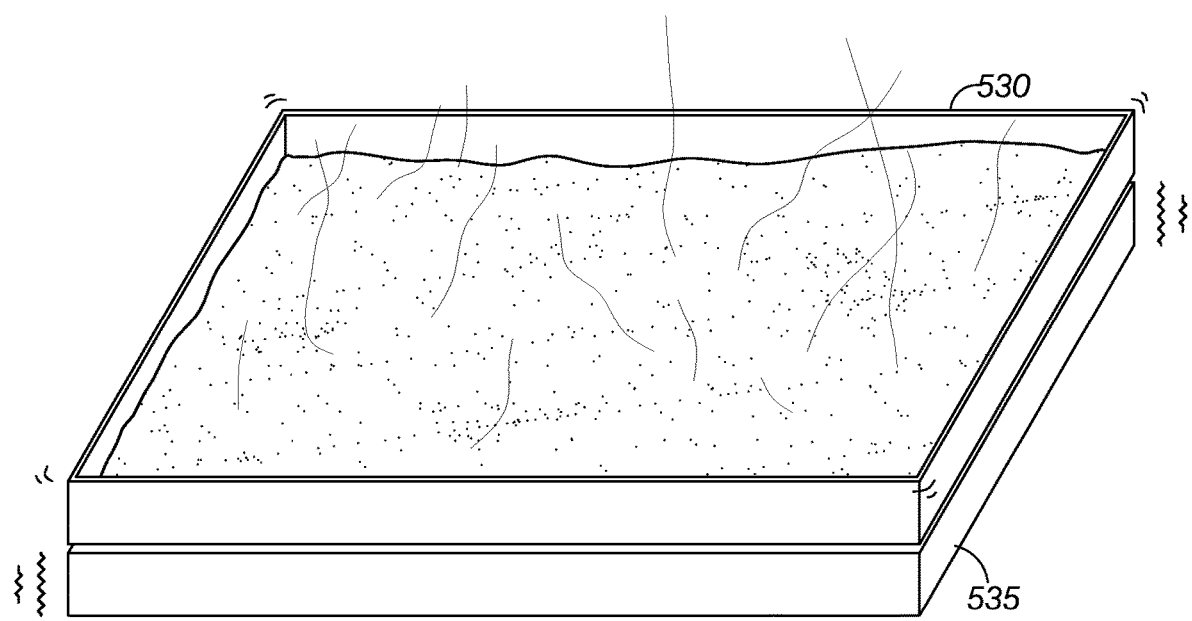
FIG. 11 illustrates the filtered mixture being exposed to a vibrating heat source to reduce the ethanol concentration of the filtered mixture.

As FIG. 8 illustrates, the ethanol-soluble, water-insoluble concentrated plant material is combined with ethanol to define a mixture at step 410. FIG. 9 illustrates an example of ethanol-soluble, water-insoluble concentrated plant material combined with ethanol to define a mixture. This disclosure notes that FIGS. 9-11, are provided for illustrative purposes only. The disclosed methods, in many cases, will be performed with different, and often much larger equipment configured to perform the illustrated steps on a commercial scale.

As FIG. 9 shows, the concentrated plant material and ethanol may be combined by depositing both the concentrated plant material and the ethanol in a single container. FIG. 9 illustrates a first container 501 containing a concentrated plant material in solution with a hydrocarbon base, butane, to define a plant material solution. Additional or alternative hydrocarbon bases may include a food-grade propylene glycol or vegetable oil.

FIG. 9 further shows a second container 505 containing a highly-concentrated ethanol-water mixture. In some examples, an ethanol-water mixture defining a 95% ethanol concentration has been effective, though greater or lesser concentrations may be used. Indeed, higher concentrations of ethanol may, in some examples, result in a purer end-product.

As FIG. 9 shows, the plant material solution is combined with ethanol-water mixture by depositing at least some of the contents of second container 505 into first container 501. In some examples, the resulting combined contents of first container 501 may be agitated or heated to help materials mix into solution.

In some examples, combining the plant material solution with ethanol produces a precipitate that is partially in solution with the mixture. Indeed, in the example shown in FIG. 9, the hydrocarbon-based plant material solution and ethanol-water solution produce a paraffin wax precipitate when combined. In some examples, the precipitate may be in solution with the other elements. Such examples may include steps to separate the dissolved precipitate, such as cooling the solution.

As FIG. 8 shows, the mixture is cooled below a predetermined precipitate removal temperature at step 415. The predetermined precipitate removal temperature is selected to cause paraffin to come out of solution. In some examples, the predetermined precipitate removal temperature is below the freezing point of the precipitate and above the freezing point of the residual substances in the mixture. At this predetermined precipitate removal temperature, the precipitate solidifies and comes out of solution while the residual substances in the mixture remain in a fluid state.

Step 415 may be useful even if some or all of the precipitate separates as a solid without cooling. Cooling the mixture may increase the speed with which the precipitate solidifies and separates from the solution. Further, cooling the mixture may help ensure that substantially all of the precipitate has separated from the solution. Indeed, cooling the mixture for a selected period of time could serve as a quality control measure that helps minimize the quantity of precipitate that remains in an end-product.

As an example, FIG. 9 illustrates first container 501 including a combination of a hydrocarbon-based plant material solution and an ethanol-water solution. As previously mentioned, this combination produces a paraffin wax. As FIG. 9 shows, cooling first container (and its contents) to a temperature below the freezing point of the paraffin wax, but above the freezing point of the combined hydrocarbon-base plant solution and ethanol-water solution, may increase the speed and effectiveness of precipitate formation. In this example, precipitate removal temperatures ranging from 32-40 degrees Fahrenheit have been found to provide effective paraffin wax removal while avoiding crystallization of concentrated plant material.

As FIG. 8 illustrates, the precipitate is filtered out of the mixture at step 420. In some examples, the precipitate is filtered out of the mixture by directing a solution including concentrated plant material, ethanol, and a solid precipitate through filter media. Examples including filter media with a pore size of 6 microns have been found to be particularly effective at removing the precipitate, particularly in examples wherein the concentrated plant material is dissolved within a hydrocarbon base and the precipitate defines a paraffin wax. Examples including filter media with a pore size of 2 microns have been found to be effective at removing an even greater portion of precipitate and may further be useful at removing other impurities, such as mold spores.

FIG. 10 illustrates an example wherein precipitate is filtered out by pouring the cooled contents of first container 501 through a funnel 510 and into a flask 520. As FIG. 10 illustrates, funnel 510 defines a standard Buchner funnel, including a receiving chamber 512 and being configured to output filtered fluid through a lower opening 514. As FIG. 10 shows, lower opening 514 of funnel 510 is fluid-tightly fitted within flask 520.

As FIG. 10 shows, filter media 515 is seated on the bottom of receiving chamber 512. Accordingly, and fluid deposited in receiving chamber 512 must pass through filter media 515 before being received in flask 520.

In some examples, filtering the precipitate out of the mixture includes filtering the cooled mixture with a suction filter. Filtering the cooled mixture with a suction filter includes lowering the pressure of a receiving container to apply suction to the fluids to be filtered.

The example shown in FIG. 10 is configured to suctionally filter cool mixture received from in receiving chamber 512 from second container 505. As FIG. 10 illustrates, flask 520 defines a fluid interface 522, which allows fluid to pass in and out of the interior of flask 520. As FIG. 10 illustrates, a fluid-transmissive line 525 may be attached to fluid interface 522 and an external aspirator to lower the pressure within flask 520 as the external aspirator draws fluid through fluid-transmissive line 525. By using a suction filter, the mixture may be more quickly and more effectively filtered.

As FIG. 8 shows, a predetermined quantity of distilled water is introduced into the mixture at step 425. By adding water prior to reducing the ethanol content of the mixture through heat and/or agitation, a user may be able to control the viscosity of the end-product. For example, the disclosed methods are often employed to produce an end-product that consists primarily of water and concentrated plant extract (with residual levels of ethanol). The reduction step is primarily directed to removing ethanol from the mixture. When removing the ethanol, however, some water may be removed either inadvertently or as a result of reducing the mixture above the boiling point of water. Adding distilled water before reducing may help produce an end-product of a desired concentration.

Further, the initial level of water may not be sufficient to produce an end-product with a desired concentration. By adding supplemental water prior to reduction, the heating and agitation of the reduction step may help ensure that the post-reduction solution is satisfactorily mixed.

As FIG. 8 shows, the amount of ethanol in the mixture is reduced until the mixture has a viscosity compatible for use with electronic cigarettes at step 430. In some examples, reducing the mixture includes heating the mixture above the boiling point of ethanol, but below the boiling point of the solvent (and/or other non-ethanol materials in the mixture). In some examples, the amount of ethanol in the mixture is reduced as low as possible while retaining substantially all of the plant material in the mixture.

In some examples, ethanol is primarily used to suspend ethanol-soluble, water-insoluble, water-insoluble concentrated plant material in a primarily-water based mixture. In such examples, the desired amount of ethanol in the end product is the minimal amount required to dissolve all of the water-insoluble concentrated plant material. By reducing the amount of ethanol, the amount of ethanol in the mixture can be adjusted toward or to this desired minimal amount.

FIG. 11 illustrates an example of the mixture being heated and agitated. After being filtered, the mixture is deposited in a tray 530 that is seated on a heating element 535. Heating element 535 is set to heat to a temperature above the boiling point of ethanol, thus heating the mixture to a temperature above the boiling point of ethanol. As FIG. 11 shows, this causes the ethanol to evaporate from the mixture.

In some examples, the mixture is heated to a temperature between the boiling point of ethanol and 180 degrees Fahrenheit. This temperature has been found to be particularly effective at evaporating ethanol while retaining substantially all of the concentrated plant material.

As FIG. 11 shows, heating element 535 is additionally configured to vibrate, which agitates the mixture during heating. The agitation accelerates the removal of ethanol from the mixture.

FIG. 11 displays the mixture deposited in a substantially rectangular tray including a heat conductive material. These tray characteristic are not required, however. For example, trays may additionally or alternatively define rounded shapes and include a wide variety of materials. Although no shape is particularly required, trays defining a great deal of exposed surface area are often desired to increase the rate at which ethanol evaporates from the mixture.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and sub-combinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and sub-combinations of the disclosed inventions that are believed to be novel and non-obvious. Inventions embodied in other combinations and sub-combinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A method, comprising:
   combining an alcohol-containing concentrated plant material, a liquid, and a solvent to obtain a mixture; and
   heating the mixture above a boiling point of ethanol and below a boiling point of the solvent to reduce an amount of alcohol in the concentrated plant material until an amount of alcohol in the mixture has a viscosity of a volatile compound to evaporate at a temperature for inhalation via an electronic cigarette or an electronic vaporizer, wherein the amount of alcohol in the mixture is reduced while retaining concentrated plant material in the mixture.

2. The method of claim 1, wherein the concentrated plant material, the liquid, and the solvent form a micelle mixture that is a multimer aggregate of the solute, the liquid, and the solvent.

3. The method of claim 1, wherein the concentrated plant material is an alcohol-soluble, water-insoluble concentrated plant material solute.

4. The method of claim 1, wherein the mixture amount includes only a residual amount of the alcohol in the concentrated plant material.

5. The method of claim 1, wherein the concentrated plant material is extracted from at least one of a terpene, a terpenoid, a phenolic, a terpenophenolic, or a terpenoresorcinolic.

6. The method of claim 1, wherein the concentrated plant material is an alcohol-soluble, water insoluble material.

7. The method of claim 1, wherein the concentrated plant material comprises a pharmaceutically-active compound.

8. The method of claim 1, further comprising placing the mixture into an electronic cigarette or an electronic vaporizer.

* * * * *